Jan. 17, 1939.  C. B. SEAMAN  2,144,000
STEERING WHEEL FOR MOTOR VEHICLES
Filed July 29, 1935   2 Sheets-Sheet 1

Inventor
Carl B. Seaman
W. A. McDowell
Attorney

Jan. 17, 1939.   C. B. SEAMAN   2,144,000
STEERING WHEEL FOR MOTOR VEHICLES
Filed July 29, 1935   2 Sheets—Sheet 2
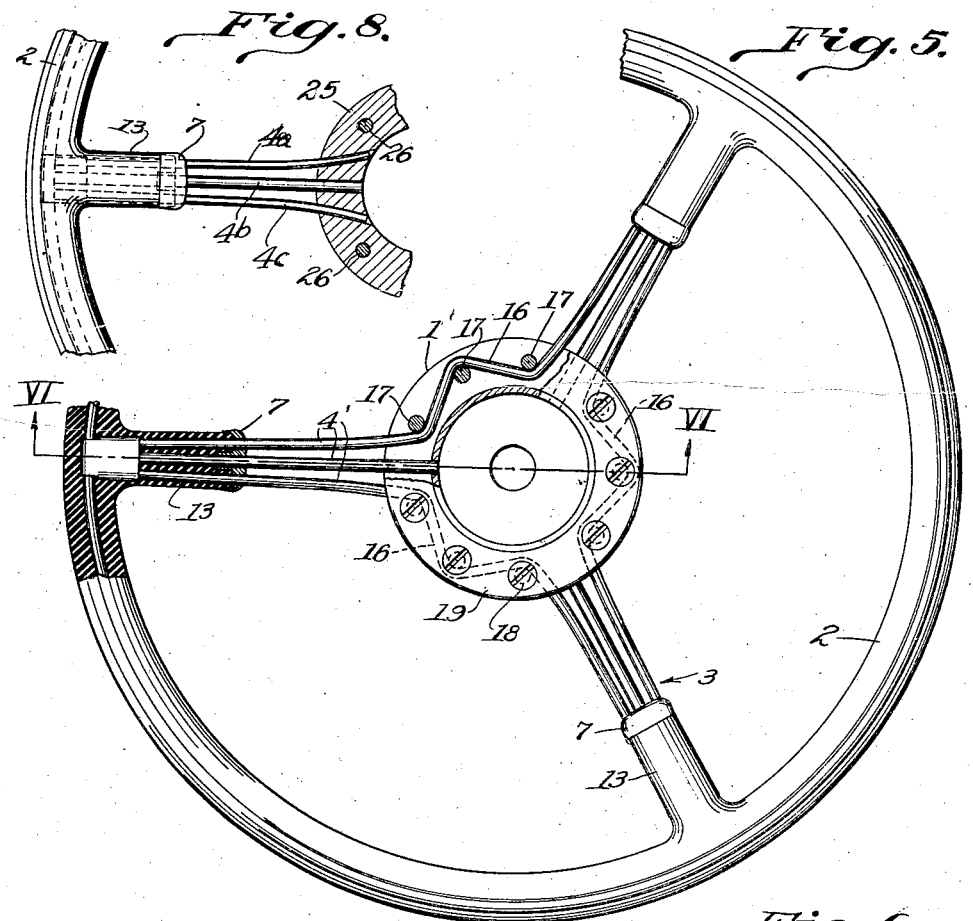
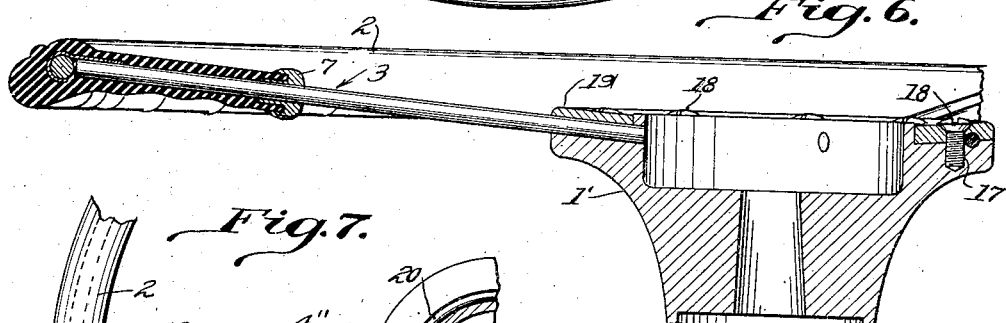
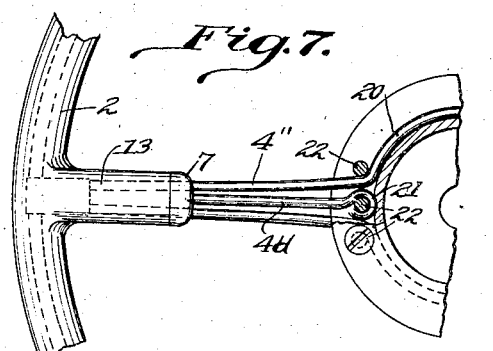
Inventor
Carl B. Seaman
By W. S. McDowell
Attorney Patented Jan. 17, 1939

2,144,000

UNITED STATES PATENT OFFICE 2,144,000

STEERING WHEEL FOR MOTOR VEHICLES

Carl B. Seaman, Columbus, Ohio

Application July 29, 1935, Serial No. 33,627

3 Claims. (Cl. 74—552)

This invention relates to steering wheels for motor vehicles and the like and more particularly to means for simplifying, rendering more efficient, absorbing road shock and improving generally the construction of such wheels whereby to render them mechanically strong yet comfortable to use and operate.

For a further understanding of the invention, reference is to be had to the following description and the accompanying drawings, wherein:

Fig. 5 is a plan view, partly in section, of a modified form of wheel embodying the present invention;

Fig. 6 is a vertical sectional view on the plane indicated by the line VI—VI of Fig. 5;

Fig. 7 is a plan view, partly in section, of a still further modified form of the present invention;

Fig. 8 is a similar view of another modification.

Referring more particularly to the drawings, the numeral 1 designates the hub of the wheel and the numeral 2 the rim thereof, the hub and rim being united by spokes 3, each comprising a group composed of a plurality of relatively resilient metallic rods as indicated at 4.

Figure 1:
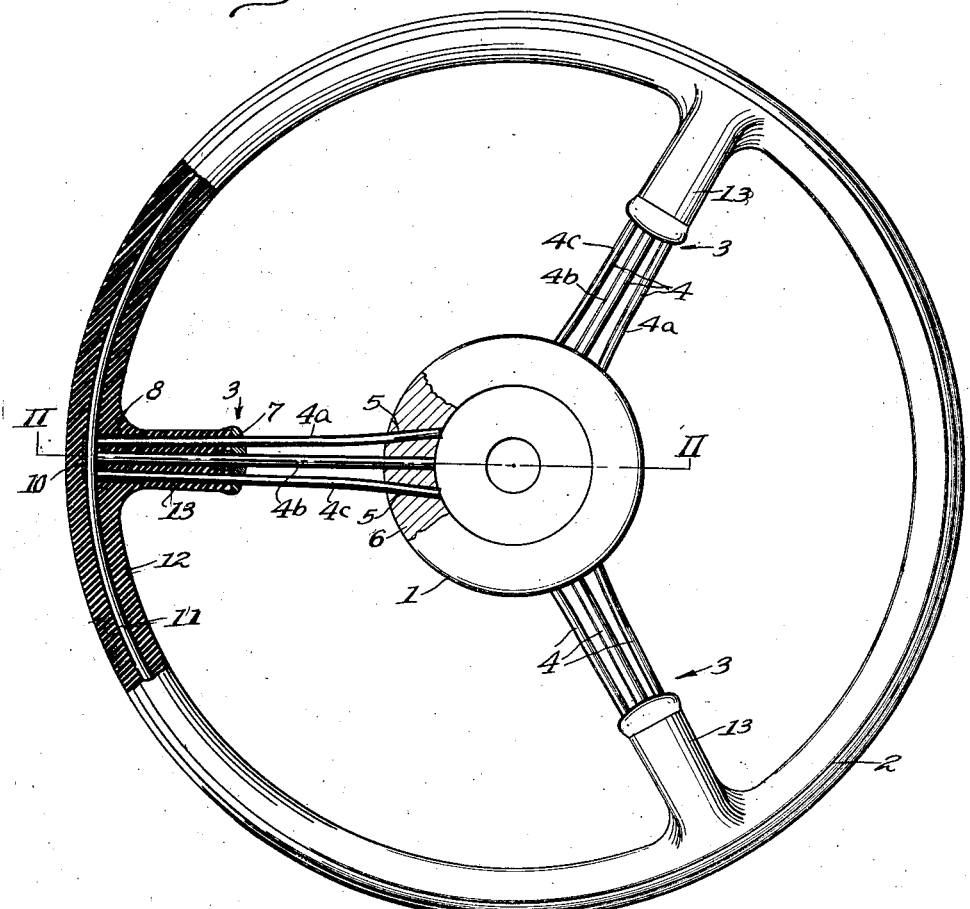
Fig. 1 is a plan view, partly in section, of a steering wheel constructed in accordance with the present invention.
Figure 2:
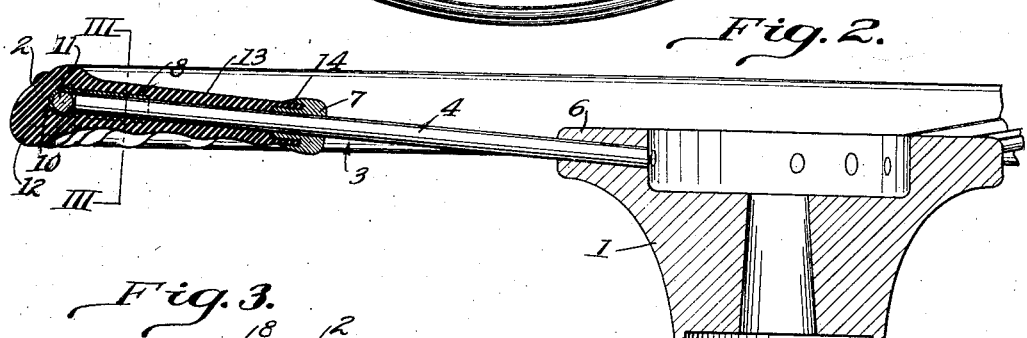
Fig. 2 is a sectional view on the plane indicated by the line II—II of Fig. 1.
Figure 3:
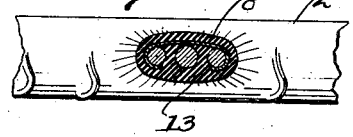
Fig. 3 is a transverse vertical sectional view on the line III—III of Fig. 2.

These rods which are represented by the numerals 4a, 4b and 4c have their inner ends received within openings 5, provided in the annular flange 6 of the hub 1 and preferably the rods or spokes extend upwardly and outwardly at an acute angle to the horizontal, as when viewed in Fig. 2 of the drawings. The inner ends of the spokes 4a and 4c are angularly bent and received within the correspondingly formed openings 5, since by this construction, outward withdrawal movement of the rods from their connected positions with the hub is resisted or precluded.

Figure 4:
Fig. 4 is a detail perspective view of the securing clip employed in uniting the outer ends of the mechanical wheel spokes.

Midway of their length, the rods 4 of each of the spokes are united against lateral or relative separation by means of a metallic band 7, while the extreme outer ends of the rods 4 are connected by metallic clips 8. As shown in Fig. 4, each of these clips has its longitudinal side portions curved inwardly as at 9 to embrace the outer ends of the rods 4, while the extreme outer end of each clip is formed with an integral curved lip 10 which is adapted to be welded or otherwise secured to a circular rim wire 11, which is embedded in the molded rubber or other composition body 12 of the rim 2. The composition material comprising the body 12 is inwardly and radially extended as at 13 in order to surround, enclose and conceal the outer portions of the spoke rods 4, and the extensions 13 terminate within sockets 14 provided in the bands 7, the latter overlapping the inner ends of said extensions to conceal the joints therebetween, as shown in Fig. 2.

By means of this construction, a motor vehicle steering wheel is provided of economical, durable and substantial construction which has the added advantage, over ordinary steering wheels, of being somewhat flexible or resilient. This feature is incorporated in the wheel by the presence and the arrangement of the metallic rods 4, the latter providing for some considerable flexibility between the rim portions of the wheel and the relatively fixed hub indicated at 1. While mechanical strength has not been sacrificed, yet this added feature of flexibility enables the wheel to be handled and operated with comfort, since the rods 4 serve to absorb road shock and vibration and to thus enhance the comfort of the vehicle operator.

In the form of my invention disclosed in Fig. 5, there has been set forth a slightly modified form of spoke construction. The spokes 4' have their inner or intermediate portions reversely bent as at 16 in order to pass around the threaded shanks or studs 17 of screws 18, which are used in uniting the hub 1' with a removable cap ring 19. By this construction, a very secure union is provided between the spokes and the wheel hub, specifically preventing the inner ends of the spokes from slipping out of their socketed connections with the hub.

In Fig. 7, the spokes 4'' have their hub engaging portions bent to assume an arcuate formation as indicated at 20 and the central spokes 4d terminate at their inner ends in eyes 21 which are secured to the hub by means of screws indicated at 22.

In Fig. 8, the inner ends of the spokes 4a, 4b and 4c are positioned within sockets formed in a brass or bronze ring 25, which is united by screws 26 to the body of the hub 1. This permits the hub to be formed from any suitable material but enables the ring 25 to be formed of the proper composition best adapted for securely holding the inner ends of the spokes.

What is claimed is:

1. A steering wheel for motor vehicles comprising a hub, a rim including a composition body having an annular reenforcing wire embedded therein, spokes for said wheel, each of said spokes being formed to embody a plurality of substantially parallel wire rods having their inner ends secured to said hub and their outer ends secured to said rim reenforcing wire, a band uniting the rods of each of said spokes intermediately of the length thereof, and spoke extensions integrally formed with the mold body of said rim, said extensions being disposed to surround the outer portions of said rods and to extend inwardly from said rim to the bands carried by said rods with the inner ends of said extensions terminating in materially spaced relationship from said hub.

2. A steering wheel for motor vehicles comprising a hub, a rim including a molded composition body having a circular metallic reenforcement embedded therein, spokes uniting said hub with said rim, each of said spokes being formed to include a plurality of substantially parallel metallic rods having their inner ends secured to said hub and their outer ends to the rim reenforcement, a band uniting the rods of each of said spokes intermediately of the length thereof, and spoke extensions constituting integral continuations of the molded composition body of said rim, the said extensions being formed to surround the outer portions of said rods and extending from said rim to said bands, the inner portions of said spokes between said hub and bands being uncovered by composition material to provide regions of limited flexibility between said hub and rim.

3. The structure as specified in claim 2 and further characterized by the inclusion of pockets formed in said bands for the reception of the molded material constituting said extensions.

CARL B. SEAMAN.